Figure 1:
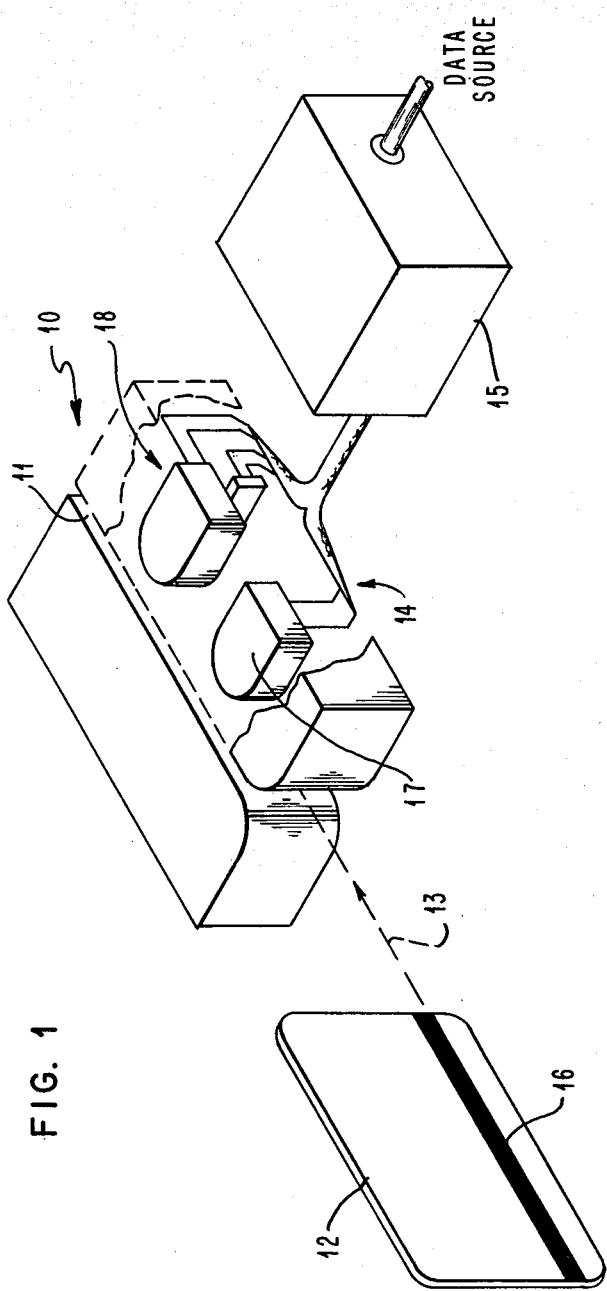

United States Patent [19]

Rohen

[11] 4,394,621

[45] Jul. 19, 1983

[54] ELECTRONIC VELOCITY MEASUREMENT ESPECIALLY FOR SELF-CLOCKING WRITE HEAD

[75] Inventor: James E. Rohen, Mint Hill, N.C.

[73] Assignee: International Business Machines Corporation, Armonk, N.Y.

[21] Appl. No.: 214,319

[22] Filed: Dec. 8, 1980

[51] Int. Cl.³ .......................... G01P 3/46; G01P 3/52
[52] U.S. Cl. ...................................... 324/163; 360/73
[58] Field of Search ............... 360/2, 51, 73; 235/436, 235/474, 476, 482; 324/163, 172, 160

[56] References Cited

U.S. PATENT DOCUMENTS

| 3,479,659 | 11/1969 | Chedaker et al. | 340/174 |
| 4,188,576 | 2/1980 | Jacobs | 324/163 |
| 4,264,934 | 4/1981 | Mattes | 360/2 |

FOREIGN PATENT DOCUMENTS 257168 10/1970 U.S.S.R. .............................. 324/163

OTHER PUBLICATIONS

M. G. Wilson, "System for Varying Oscillator Frequency", IBM Technical Disclosure Bulletin, vol. 5, No. 11, Apr. 1963.

Primary Examiner—Stanley T. Krawczewicz
Attorney, Agent, or Firm—E. Ronald Coffman

[57] ABSTRACT

A time base signal for controlling the recording of binary data is developed by measuring the velocity of a magnetic record.

The velocity is measured by providing an inductive read head and a magnetoresistive read head which sense the same flux field on the magnetic record. The difference in the outputs of these read heads is a measure of the record velocity.

2 Claims, 5 Drawing Figures

ELECTRONIC VELOCITY MEASUREMENT ESPECIALLY FOR SELF-CLOCKING WRITE HEAD

Reference is made to patent application Ser. Nos. 214,317 and 214,318 filed simultaneously herewith, which pertain to related subject matter and are commonly assigned herewith.

The use of magnetic striped cards for computer data entry has become increasingly popular in recent years. A variety of data entry applications provide simply a slot through which a magnetic stripe card can be moved by hand. The magnetic record, itself, typically follows a self-clocking protocol by which the form of the recorded bit pattern provides a time base reference for its own interpretation. With such a protocol, it is possible to read pre-recorded data with little constraint on the scanning speed. To write data with equal facility, however, it is necessary to supply an external control to cause the spacing between recorded bits to follow certain standards and thereby assure that the data can be subsequently read. This is especially true where the data is to be recorded in a self-clocking protocol.

One approach to the accurate recording of data bits is shown in U.S. Pat. No. 3,914,789 which provides a somewhat bulky optical emitter that follows, through mechanical connection, the movement of the card to generate clock pulses in direct synchronism with the card movement.

Another technique which is commonly used in a variety of data processing environments for producing clocking pulses, employs a pre-recorded clock reference track that is read from the record during the time that data is being recorded on the primary data track or tracks of the record. This approach, while technically satisfactory as to accuracy and the avoidance of mechanical moving parts, is not compatible with the existing magnetic stripe card products which make no provision for a separate clock reference track.

An object of my invention has been to provide apparatus for measuring the velocity of an object having a magnetizable surface.

Another object of my invention has been to provide a compact magnetic stripe encoder for recording self-clocking data tracks on a card with a minimum constraint on card movement.

A further object of my invention has been to provide a hand-operated magnetic stripe encoder having substantially no moving parts.

A still further object of my invention has been to provide a hand-operated magnetic stripe encoder that is operable upon magnetic stripe cards which are compatible with other existing magnetic card readers and encoders.

SUMMARY OF THE INVENTION

These objects of my invention are accomplished by providing apparatus that electronically measures the relative velocity of an object by sensing the differential response of two characteristically different magnetic sensing devices to a magnetic mark on the object. The object can be a magnetic stripe record card that is being moved by hand during encoding. For this application, the velocity measurement is employed to control the delivery of clock and data bits to the recording or encoding device such that the bits are recorded at regular spaced intervals on the stripe in accordance with a self-clocking protocol, regardless of the velocity, or variations in the velocity, at which the card is moved past the encoding station.

My invention exploits the fact that the time rate of change of the horizontal component of the flux field of a magnetic mark or flux transition is essentially proportional to the instantaneous value of the vertical component of the flux field which constitutes the mark. The magnitude of these two variables differs in part as a function of the relative velocity that produced the time rate of change. My invention thus employs an inductive magnetic sensing device which responds to the time rate of change of the horizontal component of a flux field presented thereto and, in addition, a magneto-resistive sensing device which responds to the instantaneous vertical component of the flux field, without regard to its time rate of change. These two sensing devices are positioned closely adjacent to one another so as to substantially simultaneously sense the same flux reversals on a piece of magnetic material moved adjacent thereto. The outputs derived from these devices are then converted to a common scale and are compared in appropriate circuitry to produce an output which is a function of the deviation therebetween. This deviation is a direct measure of the relative velocity and can be used for a variety of control and servo applications, including the recording control application mentioned above.

It is common practice for slot encoders to incorporate a verification read head, positioned downstream from the encoding or write head, to verify that the data has been properly recorded. The veritification read head is typically arranged to span a track that is much narrower than the width of the track created by the write head. This relationship prevents the possibility of erroneous read caused by fringing flux from adjacent tracks. My invention is conveniently incorporated in this common arrangement by simply including a magneto-resistive head alongside the existing verification read head. The normal write head thus is employed to create a flux transition which is subsequently presented simultaneously to the added magneto-resistive head, as well as the usual verification read head, to produce the data necessary to continuously monitor the velocity of the magnetic material on which the marks have been written.

Figure 2:
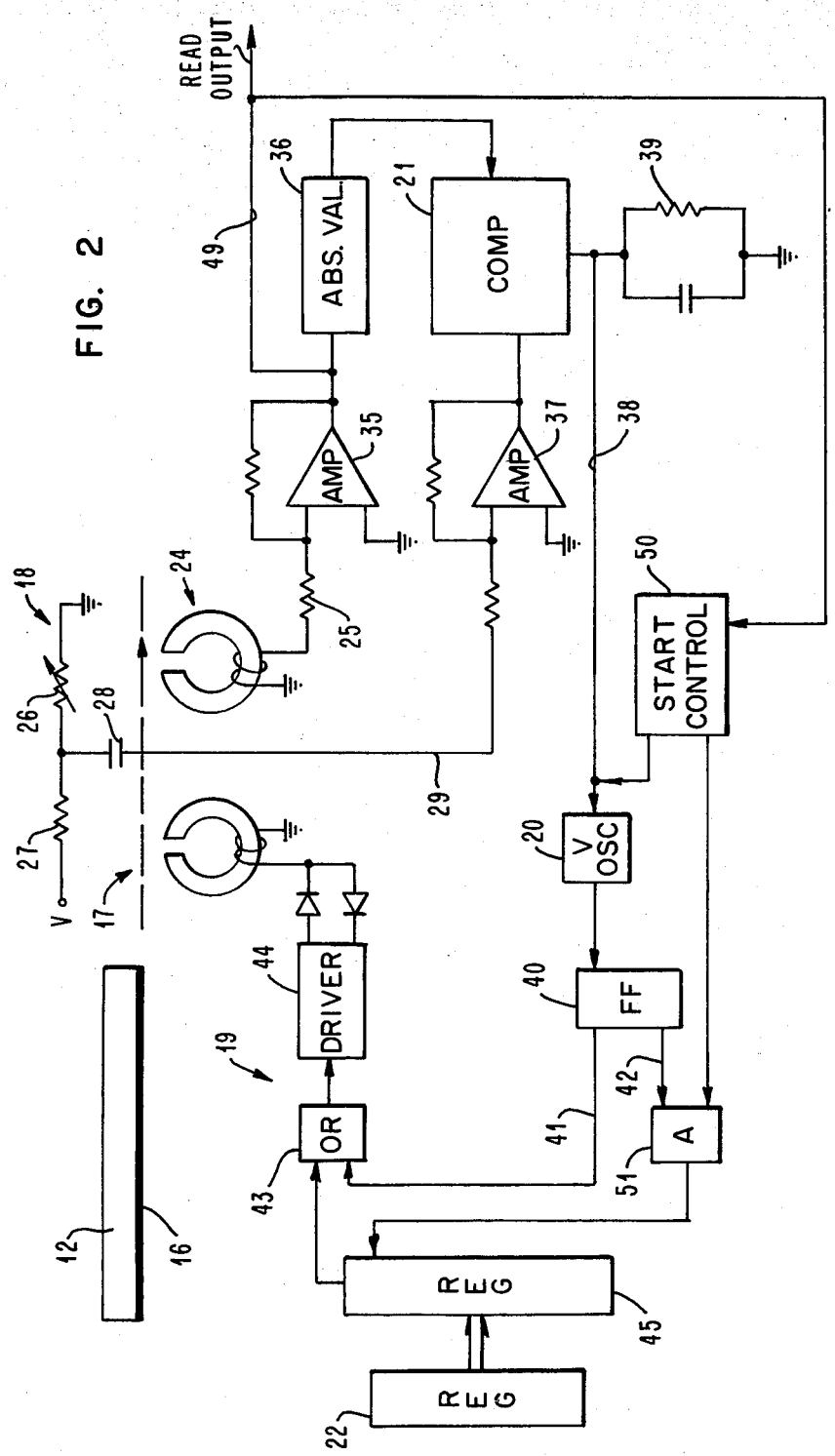
Figure 3:
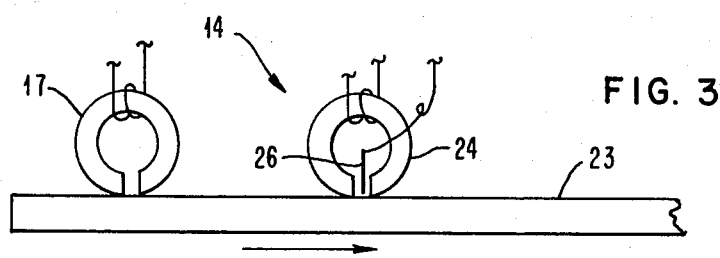
Figure 4:
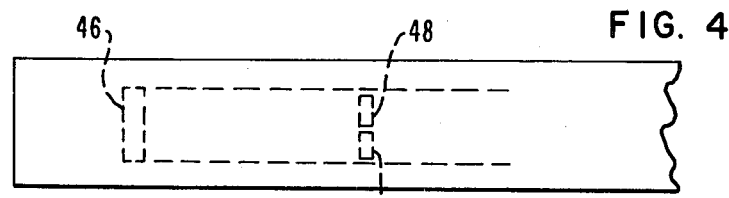
Figure 5:
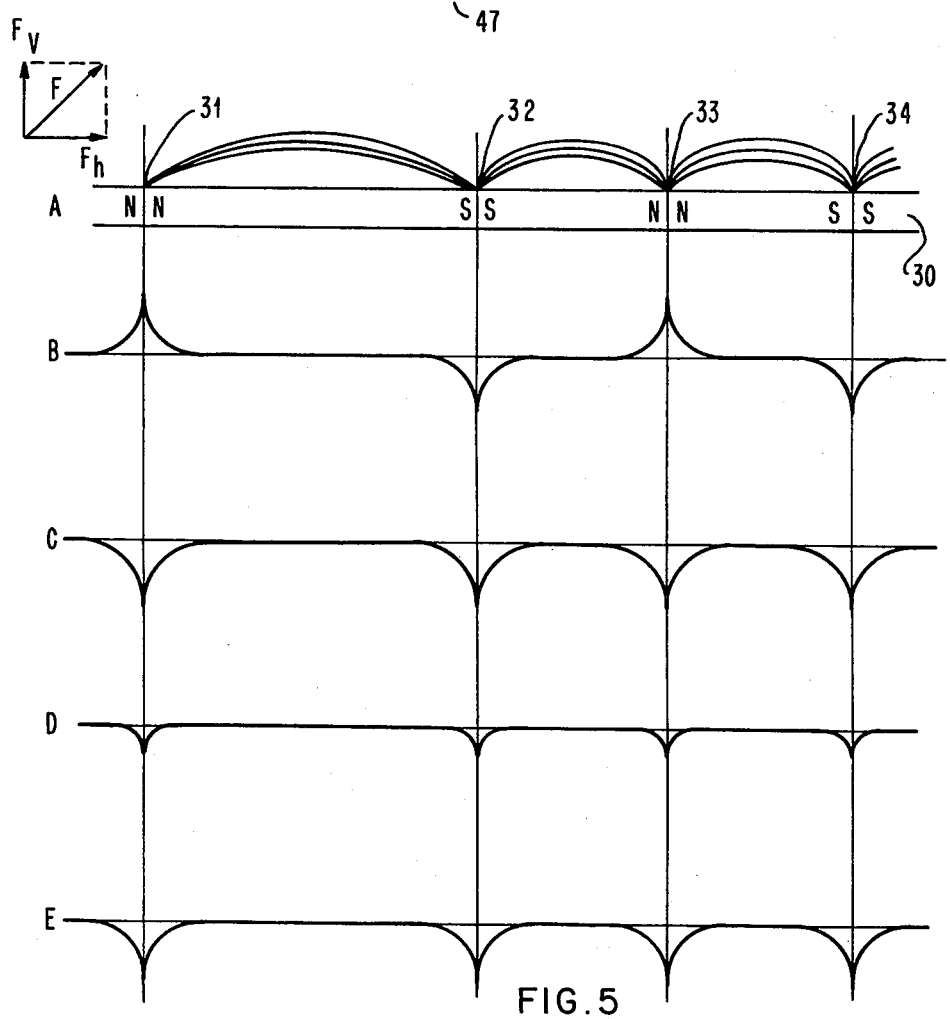

These and other objects, features and advantages of my invention will be apparent to those skilled in the art from reading the following description of a preferred embodiment of my invention wherein reference is made to the accompanying drawings, of which:

FIG. 1 is a perspective, partly broken away view of a magnetic stripe encoder, constructed in accordance with my invention, FIG. 2 is a major function diagram of circuitry illustrating the preferred embodiment of my invention, FIG. 3 is an elevational, diagrammatic view of an improved magnetic transducer assembly, constructed in accordance with my invention, FIG. 4 is a top or plan view of a piece of magnetic material illustrating the operative location of the magnetic devices in the transducer assembly illustrated in FIG. 3, and FIG. 5 is a graphical illustration of the relationship between magnetic flux and signals employed in the operation of my invention.

Referring more specifically to FIG. 1, there is shown an encoder or recording station 10, having a guide slot 11 therein, through which a magnetic record form, such as magnetic stripe card 12, can be moved by hand along path 13. A transducer assembly 14, within the encoder 10, operates to record data, supplied from a source (not shown), through the control circuitry in control unit 15 onto the magnetic stripe 16 of the card 12. In the preferred embodiment of my invention, transducer assembly 14 comprises a data recording or encoding head 17, positioned upstream of a dual sensor verification and velocity pickup head 18. While multiple recording-/verification head pairs can be employed for parallel track recording, only one need be capable of measuring velocity.

Greater detail of the transducer assembly 14 is shown in FIGS. 2-4. The encoding head 17 is connected to "write" control circuitry 19 which interrelates a time base signal produced by voltage controlled oscillator 20 controlled by velocity computing circuitry 21, with data supplied from an external source to data register 22 for writing binary data on the stripe 16.

Velocity pickup head 18 includes an induced current magnetic sensing device 24 which produces a signal on its output line 25 that is a function of the strength and polarity of the horizontal component of a juxtaposed magnetic flux field, as well as the relative velocity of the field. Head 18 further includes a magneto-resistive magnetic sensing device 26 that is operated in its range of linear output such that its resistance changes simply as a function of the strength of the vertical or normal component of a juxtaposed magnetic field. Bias for the magnetoresistive device 26 is provided by resistor 27. Capacitor 28 removes the D.C. component of the output voltage reflecting in the resistance of device 26 to supply only the A.C. component to line 29. A signal is thus produced on output line 29 that is a function of the magnetic field, independent of its rate of motion. The head 18 positions both devices 24 and 26 adjacent path 13 so that they essentially perceive the magnetic field presented by markings on stripe 16 under motion conditions that are as nearly identical as possible.

The character and relationship of the output signals from devices 24 and 26 is shown graphically in FIG. 5. Line A in FIG. 5 shows an illustrative flux field as is produced by magnetic material 30, having recorded sharp polarity transitions 31, 32, 33 and 34, as is common in digital recording. The intensity of the flux field is a vector quantity and can be divided into horizontal and vertical components $F_h$ and $F_v$, respectively. The inductive sensing device 24 responds to the time rate of change of the horizontal component $F_h$ to produce an output signal on line 25 like that shown in line B of FIG. 5. The magneto-resistive sensing device 26 responds to the vertical component $F_v$ to produce a signal on line 29 like that of line D in FIG. 4. It can be noted that the shape peaks of the signals in line B and line D are similar. In fact, I have found that by making appropriate corrections for polarity and scale, these shapes will virtually coincide.

As shown in FIG. 2, the signal on line 25 passes through scaling operational amplifier 35 to an absolute value converter 36 that simply removes the polarity component. Line C of FIG. 5 shows the signal produced by converter 36 which is supplied as the input to computational circuitry 21. The signal on output line 29 is similarly passed through a scale correction operational amplifier 37 to produce the signal shown in line E of FIG. 5 which is also supplied as the input to computational circuitry 21. Circuitry 21 employs an analog voltage level divide circuit of well known construction to compare the signals of lines C and E and provides an output on line 38 that is a properly scaled function of the relationship of these signals. As explained above, this relationship is a measure of the velocity of the record form 12 which transports the magnetic markings on its stripe 16 past the devices 24 and 26.

In practice, it may be preferred to employ other computational arrangements to enhance either the speed or accuracy of the computation. It may be necessary to account for non-linearities in the devices 24 and 26, or in the input requirement for voltage controlled oscillator 20. A difference, rather than a ratio relationship, may be more convenient to work with, given particular electronic components. Digital, rather than analog, techniques can be employed using, for example, a programmed micro-processor. One especially versatile digital technique employs the use of a table look-up memory, addressed by the digitized signals from lines C and E of FIG. 5 to select from memory a pre-stored empirically determined velocity value.

The voltage signal on line 38 (FIG. 2) is smoothed by RC circuit 39 and is applied to the voltage controlled oscillator 20 which generates time base pulses that are spaced in proportion to the velocity of card 12. The output pulses thus occur at regular intervals with respect to the actual position of the card 12 as it moves through slot 11.

Oscillator 20 supplies pulses to edge triggered flip-flop circuit 40 to produce alternate outputs on lines 41 and 42. The pulses on line 41 are applied to control the writing of clock pulses by write head 17 through OR circuit 43 and driver circuit 44. The pulses on line 42 are applied to gate a data bit out of shift register 45 to OR circuit 43. Since the protocol for the code to be recorded calls for a series of clock bits initially, shift register 45 will be initially loaded with a series of 0's so that the first recording by write head 17 will be simply clock bits. Shift register 45 is thereafter loaded from a data input register 22 with the actual pattern of 1's and 0's to be recorded. Driver circuit 44 alternates between its two outputs with each application of an input pulse to thereby change the direction of current supply to write head 17, either upon the receipt of a clock bit from line 41 or a data bit, if a "1" is gated from shift register 45.

The velocity measuring technique of my invention is capable of operating from any appropriate magnetic marking. The preferred embodiment of my invention, however, employs a transducer assembly, as shown in FIGS. 3 and 4, including writing device 17 which produces a relatively wide recording track 46, FIG. 4, and is positioned upstream of side-by-side sensing devices 24 and 26. These devices sense respective relatively narrow portions 47 and 48 of the wide track 46 shown in FIG. 4. Inductive device 24 is thus positioned to read for verification the data recorded by writing device 17. This normal function utilizes the signals on output line 49. This preferred arrangement also enables the writing device 17 to record the marks necessary for the velocity sensing head 18 to act upon.

In operation, when no card is presented to the transducer assembly 14, oscillator 20 (FIG. 2) is controlled by start control 50 to provide pulses at a fixed rate. Start control 50 also holds AND gate 51 closed in response, for example, to the absence of pulses on read output line 49 to inhibit shifting of shift register 45. When record card 12 is moved into the slot 11 along path 13, its stripe 16 will receive a flux transition recording by write head 17 in response to one of these oscillator pulses. When this flux transition arrives at the velocity measuring head 18, the signals shown in FIG. 5 are generated, and an output from computational circuitry 21 sets the voltage control oscillator 20 to produce pulses at the rate required for recording. Each of the subsequent flux transitions recorded by head 17 will likewise be sensed by the velocity measuring head 18 to maintain the rate of pulses from oscillator 20 at an appropriate rate. Inhibition of shift register 45 is removed upon detection of a predetermined number of pulses on read output line 49 and the data from input register 22 is supplied to the write head 17 for encoding on the magnetic record. This data, when presented to the inductive sensing device 24, will produce signals on line 25 which can be used via the read output line 49 to verify the successful recording of the data.

Those skilled in the art will recognize that while a specific illustrative embodiment of my invention has been disclosed, various modifications and alternatives to this embodiment can be made by those skilled in the art, without departing from the principles of my invention. It is possible, for example, for the transducing head 14 to be mounted on a hand-held device, such that the transducing head is moved manually past a stationary record form. Furthermore, the circuitry shown can be varied as required to meet ordinary speed cost and reliability for a particular implementation. Accordingly, the scope of my invention is intended to be limited only by the language of the appended claims.

I claim:

1. Velocity measuring apparatus for producing an electrical measurement of the velocity of an object having at least one magnetically sensible mark thereon, wherein the improvement comprises:
   an induced current magnetic field sensing device,
   a variable resistance magnetic field sensing device,
   means supporting said devices closely adjacent, one to another, for encountering said mark during substantially the same state of relative motion with respect to said object, and
   means responsive to a signal output from each of said devices for producing said electrical measurement.

2. Velocity measuring apparatus, as defined in claim 1, wherein said means responsive to said signal output comprises means for operatively dividing said signals one by the other.

* * * * *